Patented Oct. 28, 1952

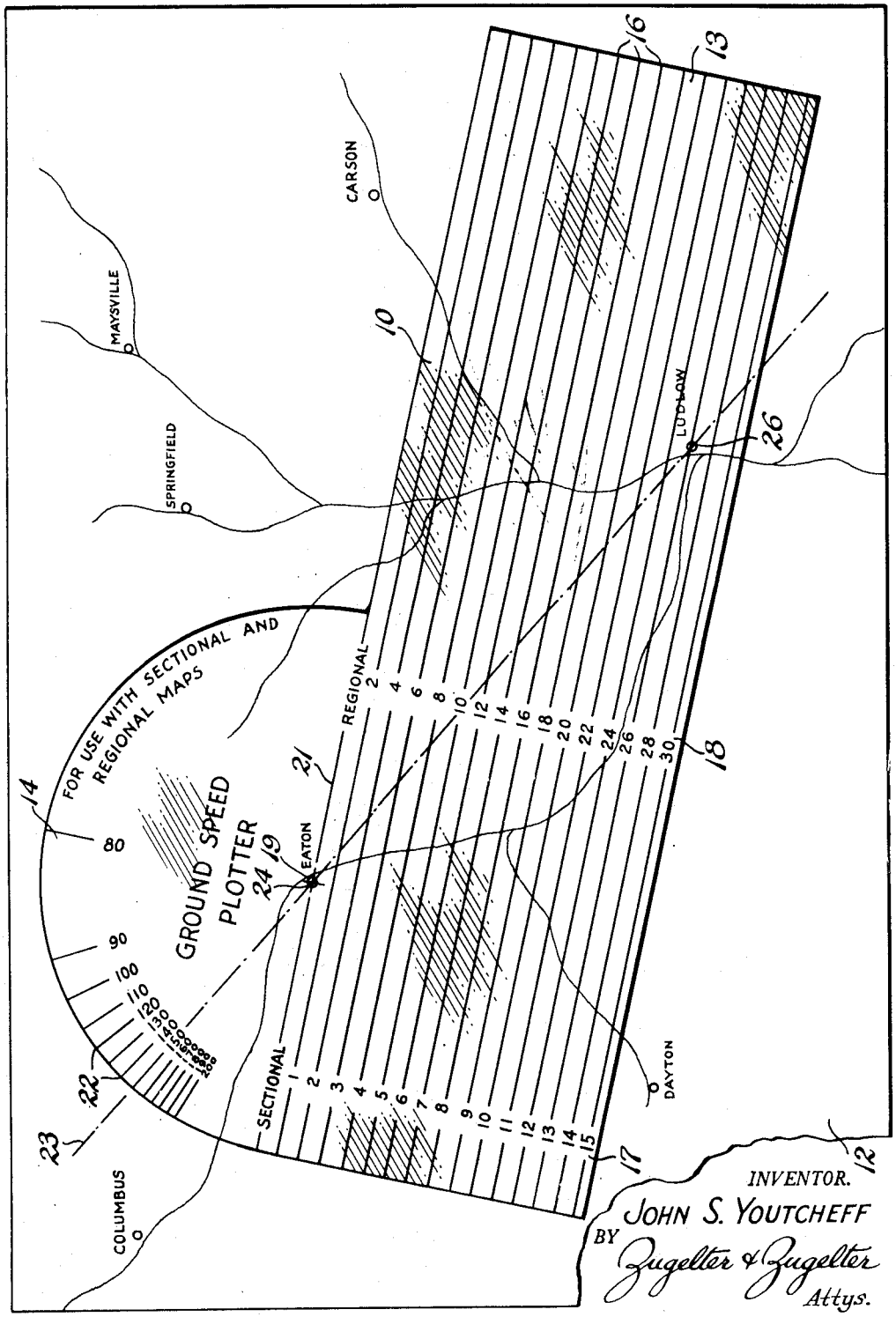

2,615,625

UNITED STATES PATENT OFFICE 2,615,625

GROUND SPEED PLOTTER

John Sheldon Youtcheff, Cincinnati, Ohio

Application January 20, 1950, Serial No. 139,777

2 Claims. (Cl. 235—61)

This invention relates to a device for determining ground speed of an aircraft.

An object of this invention is to provide a device capable of determining ground speed of an aircraft by inspection of the device and a chart.

A further object of this invention is to provide a ground speed plotter which reads ground speed directly when used in conjunction with a chart.

A further object of this invention is to provide a compact, light weight plotter from which ground speed can be determined with the aid of conventional equipment such as charts and a watch.

A further object of this invention is to provide a plotter from which expected time of arrival can readily be determined when the ground speed is known.

The above mentioned and other objects may be attained by the means described herein and disclosed in the accompanying drawing.

The drawing represents a ground speed plotter constructed in accordance with this invention, the plotter being shown superimposed on a chart.

Briefly, the plotter includes a time scale, which may be laid out with a series of spaced parallel lines scaled in time intervals, and a speed scale having angularly spaced graduations. The speed graduations may be ranged about an index point which may be on an initial or reference line of the time scale.

As illustrated in the drawing, a ground speed plotter constructed in accordance with this invention is indicated at 10. The plotter 10 is shown on a chart 12, the chart 12 having appropriate markings, as indicated, to show features of terrane and the like.

The plotter 10 may be formed from a flat sheet of transparent material such as a transparent plastic material, glass, or the like. The plotter 10 may include a time scale portion 13 and a speed scale portion 14. The time scale portion 13 may be of elongated, substantially rectangular shape and may have a series of parallel, equally spaced lines 16 which may be etched or otherwise imprinted on the plotter 10 with clear, transparent portions thereof remaining between the lines 16. As indicated at 17 and 18, the lines 16 may be provided with appropriate scale indicia.

An index point 19 is provided, which may be on an index or reference line 21 along a lengthwise edge of the rectangular time scale portion 14 and parallel to the lines 16. As shown, the line 21 may be on the juncture between the time scale portion 13 and the offset speed scale portion 14. The speed scale portion 14 may be of semi-circular shape and may be formed integrally with the time scale portion 13, the index point 19 forming the center of the speed scale portion 14. The speed scale portion 14 may be provided with scale indicia 22 ranged in angular relationship about the index point 19. The indicia 22, like the lines 16 of the time scale, may be etched or otherwise formed in the material of the plotter 10 to leave clear spaces between scale markings.

The operation of the plotter 10 will be described with reference to its use in connection with a sectional aeronautical chart 12, but its use with a regional chart is similar, the only difference being the use of a different scale.

A course line is indicated at 23 passing over reference points 24 and 26, shown on the chart 12 as towns named "Eaton" and "Ludlow." Time of travel between the reference points 24 and 26 is measured, as with a stop watch. The course line is drawn on the chart 12 and is extended on both sides of the first reference point 24. Then the plotter 10 may be laid on the chart 12 with the index point 19 over the first reference point 24. The appropriate scale line 16 is placed over the second reference point 26. In the case of the drawing, the sectional scale line indicating 13 minutes elapsed time is placed over the second reference point 26. Ground speed can be read immediately on the speed scale 14 where the extension of the course line 23 intersects the speed indicia 22, and is indicated on the drawing as a speed of 150 miles per hour over the ground.

As will be apparent, the plotter can be used in a reverse manner to determine expected time of arrival when the course and ground speed are known. For example, if it were known that the ground speed of an aircraft were 150 miles per hour as the plane passed over the first reference point 24, the plotter 10 could be placed upon the chart 12 in the position shown, and the expected time of flight to the second reference point 26 could be read directly from the scale line which crosses it, here shown as 13 minutes for a sectional chart.

The spacing between the scale lines 16 may be any selected distance. For example, the scale lines 16 may be approximately one-eighth inch apart and may have time indicia 17 in one minute intervals for use with sectional charts. The indicia 17 start at the reference line 21. The spacing of the indicia 22 on the speed scale 14 will be a function of the spacing between the scale lines 16 and of the scale of the chart. The speed indicia may be calibrated by calculating in the usual manner from the distance between a pair of points the speed required to go between the points in a given length of time. A course line can be drawn between the points and extended beyond one of the points. The plotter can then be positioned over the points in the manner outlined above and an indication of the speed can be made on the speed scale 14. Additional points of the indicia 22 can similarly be calibrated until sufficient indicia are provided.

The same speed scale indicia can be used for both sectional and regional charts. The sectional charts have twice the lineal scale of the regional charts, and the time scale 16, as shown, may be equipped with speed scale indicia 17 for sectional charts spaced in one minute time intervals and also the scale indicia 18 for regional charts spaced in two minute time intervals. The speed scale indicia 22 can be used with both the sectional chart indicia 17 and the regional chart indicia 18. Only a single plotter need be used for both regional and sectional charts for all parts of the country.

The plotter of this invention is of particular value for use on cross-country flights in small aircraft because the plotter may be of moderate size and weight and because the only instruments required in addition to the plotter are appropriate charts, a watch, and a drawing instrument such as a common pencil.

The plotter may be made of any appropriate transparent sheet material but preferably is made from a tough transparent plastic sheet material, for example, a methyl methacrylate resin.

As will be apparent, the scales may be varied to make the plotter suitable for use in aircraft of various speeds. Various other modifications will be apparent, and the invention is not intended to be limited by the foregoing detailed description and the drawing except as set out in the appended claims.

What is claimed is:

1. A plotting instrument which comprises a flat sheet of transparent material, a plurality of spaced parallel lines on said sheet denoting time, one of said lines being the origin line, a time scale associated with said parallel lines, said time scale consisting of indicia indicating successive intervals of time commencing at the origin line, an index point on the origin line, spaced speed indicating indicia on said sheet and arranged to form a series of straight lines passing through said index point and angularly spaced around the index point, and a speed scale associated with said speed indicating indicia, the indicia of the speed scale being spaced to accord with the time scale to correlate time and speed with distances measured from the index point to the lines, whereby, when the instrument is placed on a chart having a predetermined scale with the index point at a point of departure with a line connecting the point of departure with a destination passing through a given speed on the speed scale, the destination appears beneath the time line indicating the time required to travel between the point of departure and the destination at the given speed.

2. A plotting instrument in accordance with claim 1 characterized by the fact that the parallel lines are equally spaced and that the indicia of the time scale progress in arithmetic progression.

JOHN SHELDON YOUTCHEFF.

REFERENCES CITED

The following references are of record in the file of this patent:

UNITED STATES PATENTS

| Number | Name | Date |
|---|---|---|
| 1,528,944 | Newell | Mar. 10, 1925 |
| 1,930,478 | Jones | Oct. 17, 1933 |
| 1,985,907 | Weems | Jan. 1, 1935 |
| 2,345,020 | Warner | Mar. 28, 1944 |
| 2,412,901 | McCoshen | Dec. 17, 1946 |
| 2,435,606 | Sadowsky | Feb. 10, 1948 |
| 2,487,590 | Rehill | Nov. 8, 1949 |
| 2,495,777 | Schroeder | Jan. 31, 1950 |
| 2,508,898 | Stronstorff | May 23, 1950 |